(12) United States Patent
Bond et al.

(10) Patent No.: US 7,798,577 B2
(45) Date of Patent: Sep. 21, 2010

(54) APPARATUS INCLUDING A BRAKE CONTROL ASSEMBLY HAVING A BRAKE FLUID ACCUMULATOR ASSEMBLY

(76) Inventors: James R. Bond, 9830 Rose Arbor Dr., Centerville, OH (US) 45458; Daniel N. Borgemenke, 580 Beckley Farm Way, Springboro, OH (US) 45066; Matthew A. Cukovecki, 7040 Tipp-Elizabeth Rd., New Carlise, OH (US) 45344; Earl Wayne Lloyd, 954 Deer Run Trail, Lebanon, OH (US) 45036; Jerry L. Newton, 820 Hidden Valley La., Richmond, IN (US) 47374

( * ) Notice: Subject to any disclaimer, the term of this patent is extended or adjusted under 35 U.S.C. 154(b) by 325 days.

(21) Appl. No.: 11/706,090

(22) Filed: Feb. 13, 2007

(65) Prior Publication Data

US 2008/0191548 A1     Aug. 14, 2008

(51) Int. Cl.
  *B60T 8/42* (2006.01)
  *B60T 13/74* (2006.01)
(52) U.S. Cl. .................. 303/115.2; 303/3; 303/142; 188/72.8
(58) Field of Classification Search .............. 303/115.1, 303/115.2, 113.1, 113.2, 113.5, 137, 139, 303/142, 3; 188/156, 72.8; 701/82, 83
  See application file for complete search history.

(56) References Cited

U.S. PATENT DOCUMENTS

| | | | | | |
|---|---|---|---|---|---|
| 4,479,397 | A | * | 10/1984 | Jelinek et al. | 74/89.37 |
| 4,805,965 | A | * | 2/1989 | Jonner et al. | 303/113.2 |
| 4,938,543 | A | * | 7/1990 | Parker et al. | 303/113.2 |
| 5,042,885 | A | * | 8/1991 | Villec | 303/144 |
| 5,163,744 | A | * | 11/1992 | Tierney et al. | 303/115.2 |
| 5,207,488 | A | * | 5/1993 | Newton et al. | 303/115.2 |
| 5,499,865 | A | * | 3/1996 | Katagiri et al. | 303/115.2 |
| 5,927,825 | A | * | 7/1999 | Schenk et al. | 303/115.2 |
| 2002/0125764 | A1 | * | 9/2002 | Sakamoto | 303/9.63 |

* cited by examiner

*Primary Examiner*—Melody M Burch
(74) *Attorney, Agent, or Firm*—Dickinson Wright PLLC; William H. Honaker

(57) ABSTRACT

Apparatus including a brake control assembly having a brake fluid accumulator assembly. The brake fluid accumulator assembly includes a brake fluid orifice, at least one brake-fluid-accumulating piston bore, a controllable bi-directional motor, and at least one piston. The brake fluid orifice is fluidly connectable to a brake apply master cylinder and is fluidly connectable to a wheel brake. The at-least-one brake-fluid-accumulating piston bore is fluidly connected to the brake fluid orifice. The motor has a first motor driving direction and an opposite second motor driving direction. The at-least-one piston is each positioned in and slidable within a corresponding brake-fluid-accumulating piston bore and is each movable by the motor, in the first motor driving direction, to move in compression within the corresponding brake-fluid-accumulating piston bore.

16 Claims, 3 Drawing Sheets

APPARATUS INCLUDING A BRAKE CONTROL ASSEMBLY HAVING A BRAKE FLUID ACCUMULATOR ASSEMBLY

TECHNICAL FIELD

The present invention relates generally to braking systems, and more particularly to apparatus including a brake control assembly having a brake fluid accumulator assembly.

BACKGROUND OF THE INVENTION

Vehicle braking systems often include a brake control assembly to provide anti-lock-braking (ABS) functionality which utilizes a brake fluid accumulator assembly of a brake control assembly, wherein the brake control assembly sometimes is called a hydraulic control unit or HCU.

A conventional brake fluid accumulator assembly is a passive pump-inlet (release) accumulator having a piston and spring mechanization which relies on the pressure volume relationship (high pressure, low volume transitioned into low pressure, high volume) to relieve excess brake pressure from the wheel brake to avoid wheel lockup during braking. The minimum release pressure at the wheel brake is limited by the accumulator preload and the piston seal drag. The accumulator preload, provided by the compressed spring during assembly, is necessary to ensure a minimum inlet pressure to the non-self-priming controllable pump to ensure pump-out (emptying) of the accumulator and to ensure that the piston overcomes seal forces to return to its home position. Seal drag results from the "standard" needs of the dynamic seal interface between the bore and the piston.

A conventional brake control assembly having a brake fluid accumulator assembly typically includes check valves and various controllable valves. A controllable pump and the controllable valves are operatively connected to an electronic control unit. The electronic control unit receives inputs from wheel speed sensors and/or other system inputs to control the controllable pump and the controllable valve to prevent wheel lockup during brake apply by the driver, as is known to those skilled in the art.

What is needed is an improved brake control assembly having a brake fluid accumulator assembly.

SUMMARY OF THE INVENTION

A first expression of an embodiment of the invention is for apparatus including a brake control assembly having a brake fluid accumulator assembly. The brake fluid accumulator assembly includes a brake fluid orifice, at least one brake-fluid-accumulating piston bore, a controllable bi-directional motor, and at least one piston. The brake fluid orifice is fluidly connectable to a brake apply master cylinder and is fluidly connectable to a wheel brake. The at-least-one brake-fluid-accumulating piston bore is fluidly connected to the brake fluid orifice. The motor has a first motor driving direction and an opposite second motor driving direction. The at-least-one piston is each positioned in and slidable within a corresponding brake-fluid-accumulating piston bore and is each movable by the motor, in the first motor driving direction, to move in compression within the corresponding brake-fluid-accumulating piston bore.

A second expression of an embodiment of the invention is for apparatus including a brake control assembly having a brake fluid accumulator assembly. The brake fluid accumulator assembly includes a brake fluid orifice, at least one brake-fluid-accumulating piston bore, a controllable bi-directional motor, and at least one piston. The brake fluid orifice is fluidly connectable to a brake apply master cylinder and is fluidly connectable to a wheel brake. The at-least-one brake-fluid-accumulating piston bore is fluidly connected to the brake fluid orifice. The motor has a first motor driving direction and an opposite second motor driving direction. The motor is operatively connectable to an electronic control unit. The at-least-one piston is each positioned in and slidable within a corresponding brake-fluid-accumulating piston bore and is each movable by the motor, in the first motor driving direction, to move in compression within the corresponding brake-fluid-accumulating piston bore. The brake fluid accumulator assembly is an anti-lock-braking-system (ABS) brake fluid accumulator assembly, the brake apply master cylinder is a motorcycle brake apply master cylinder, and the wheel brake is a motorcycle wheel brake.

Several benefits and advantages are derived from one or more of the expressions of an embodiment of the invention. In one example, the at-least-one piston includes first and second pistons (both "floating pistons") which are not movable by the motor, in the second motor driving direction, to move in expansion within the first piston bore. Experiments support a reduced sensitivity to over-release conditions, and a lower minimum ABS release pressure compared to a conventional brake fluid accumulator assembly. In a second example, the second piston becomes an "attached piston" which is movable by the motor, in the second motor driving direction, to move in expansion within the second piston bore. In one ABS implementation, this should allow an even lower minimum release pressure (approximately 0.5 atmospheres), and support a faster release time during ABS without undesirable phase transition of the brake fluid. This should allow ABS in a motorcycle application, where a very low minimum release pressure during ABS would be required, as can be appreciated by those skilled in the art.

DETAILED DESCRIPTION

Figure 1:
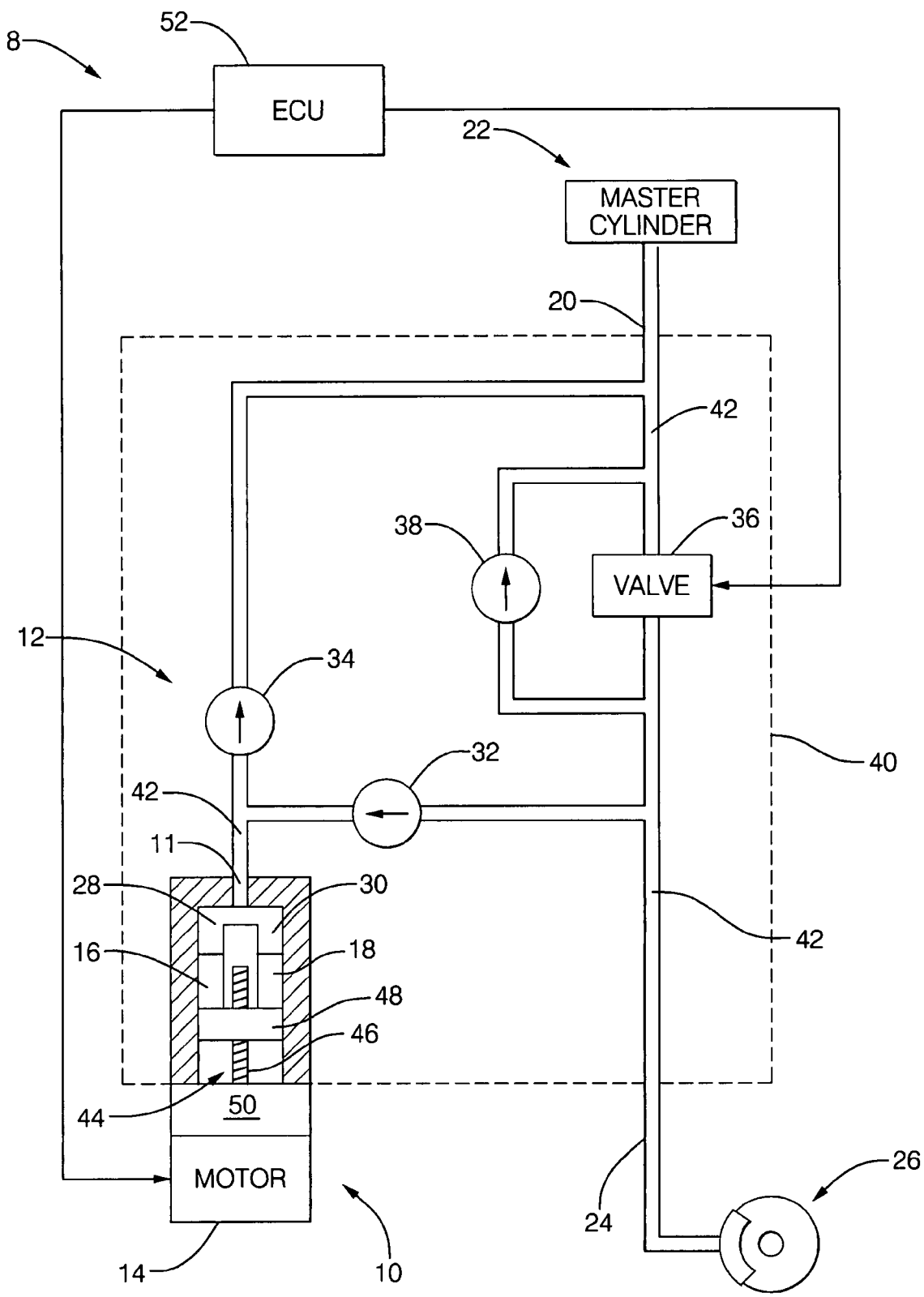
FIG. 1 is an explanatory block diagram of an embodiment of a brake control assembly, including a fluid accumulator assembly, of the invention shown operatively connected to a brake apply master cylinder, a wheel brake, and an electronic control unit.
Figure 2:
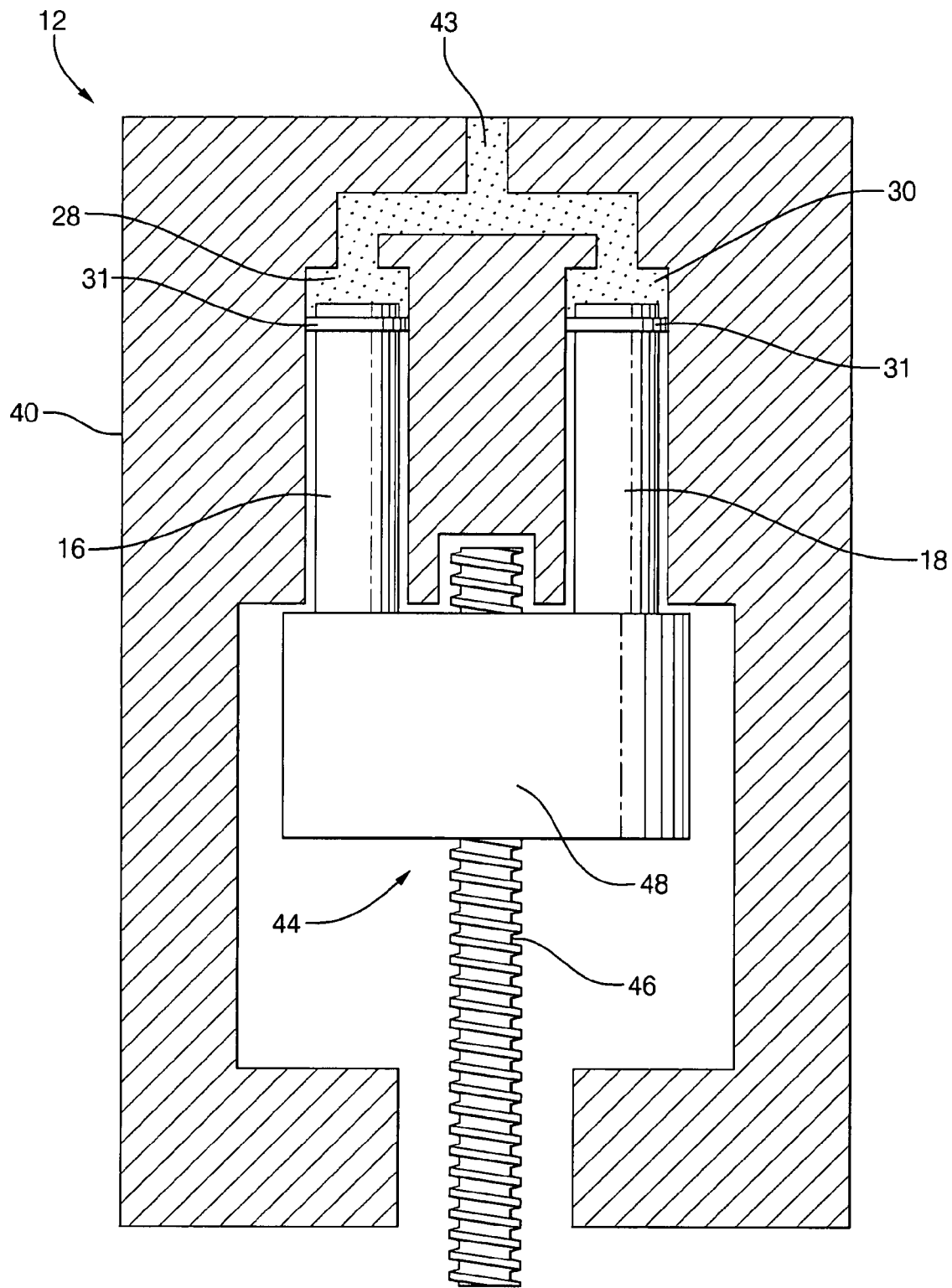
FIG. 2 is an enlarged, cutaway, schematic view of at least a portion of the brake fluid accumulator assembly of FIG. 1 showing a ball screw, a ball nut, a "floating" first piston, and an "attached" second piston with the pistons moving in compression within their corresponding bores of the brake fluid accumulator assembly within a housing of the brake control assembly.
Figure 3:
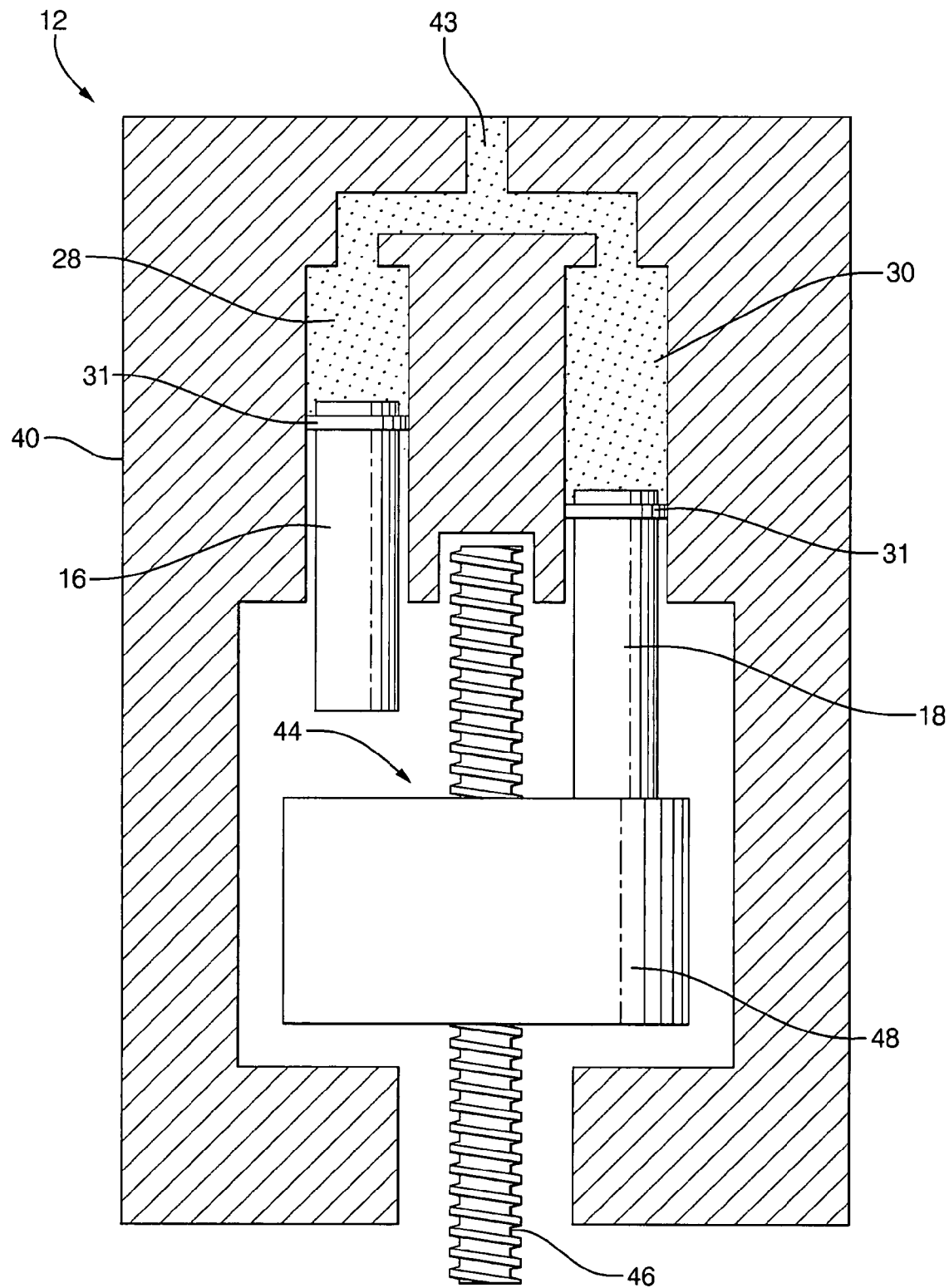
FIG. 3 is a view, as in FIG. 2, but with the pistons moving in expansion within their corresponding bores of the brake fluid accumulator assembly.

An embodiment of apparatus 8 of the invention is shown in FIGS. 1-3. A first expression of the embodiment of FIGS. 1-3 is for apparatus 8 including a brake control assembly 12 having a brake fluid accumulator assembly 10. The brake fluid accumulator assembly 10 includes a brake fluid orifice 11, at least one brake-fluid-accumulating piston bore 28 and 30, a controllable bi-directional motor 14, and at least one piston 16 and 18. The brake fluid orifice 11 is fluidly connectable to a brake apply master cylinder 22 and is fluidly connectable to a wheel brake 26. The at-least-one brake-fluid-accumulating piston bore 28 and 30 is fluidly connected to the brake fluid orifice 11. The motor 14 has a first motor driving direction and an opposite second motor driving direction. The at-least-one piston 16 and 18 is each positioned in and slidable within a corresponding brake-fluid-accumulating piston bore 28 and 30 and is each movable by the motor 14, in the first motor driving direction, to move in compression within the corresponding brake-fluid-accumulating piston bore 28 and 30. See FIGS. 1 and 2. In one construction of the first expression of the embodiment of FIGS. 1-3, the at-least-one piston 16 and 18 is equipped with a piston seal 31.

In one enablement of the first expression of the embodiment of FIGS. 1-3, the at-least-one brake-fluid-accumulating piston bore 28 and 30 includes first and second piston bores 28 and 30, wherein the at-least-one piston 16 and 18 includes a first piston 16 disposed in the first piston bore 28 and a second piston 18 disposed in the second piston bore 30. In one variation, the first piston 16 (called a "floating piston" in this variation) is not movable by the motor 14, in the second motor driving direction, to move in expansion within the first piston bore 28. In one modification, the second piston 18 (called an "attached piston" in this modification) is movable by the motor 14, in the second motor driving direction, to move in expansion within the second piston bore 30. See FIGS. 1 and 3.

Other enablements including those having one, three or more pistons with a corresponding number of piston bores, and those having other numbers (including zero) of attached pistons (while having at least one floating piston) are left to the artisan. In one example, the floating piston prevents undesirable brake fluid phase transition from liquid to gas when the attached piston(s) are moved by the motor during expansion within the corresponding piston bores, as can be appreciated by those skilled in the art.

In one arrangement of the first expression of the embodiment of FIGS. 1-3, the brake control assembly 12 also includes a brake fluid inlet 20 which is fluidly connected to the brake fluid orifice 11 of the brake fluid accumulator assembly 10 and which is fluidly connectable to the brake apply master cylinder 22 and includes a brake fluid outlet 24 which is fluidly connected to the brake fluid orifice 11 of the brake fluid accumulator assembly 10. In this arrangement, the brake control assembly 12 further includes a check valve 32 disposed between the brake fluid outlet 24 of the brake control assembly 12 and the at-least-one brake-fluid-accumulating piston bore 28 and 30 allowing direct flow from the brake fluid outlet 24 of the brake control assembly 12 to the at-least-one brake-fluid-accumulating piston bore 28 and 30. In one variation, the brake control assembly 12 additionally includes a check valve 34 disposed between the brake fluid inlet 20 of the brake control assembly 12 and the at-least-one brake-fluid-accumulating piston bore 28 and 30 allowing direct flow from the at-least-one brake-fluid-accumulating piston bore 28 and 30 to the brake fluid inlet 20 of the brake control assembly 12.

In one modification, the brake control assembly 12 also includes a controllable valve 36 (labeled "valve" in FIG. 1) disposed between the brake fluid inlet 20 and the brake fluid outlet 24 of the brake control assembly 12 allowing, when open, direct flow in both directions between the brake fluid inlet 20 and brake fluid outlet 24 of the brake control assembly 12 and blocking, when closed, direct flow in both directions between the brake fluid inlet 20 and brake fluid outlet 24 of the brake control assembly 12. In one example, the controllable valve 36 is a linear apply valve. In one illustration, a bypass check valve 38 allows flow past the controllable valve 36 from the wheel brake 26 to the brake apply master cylinder 22.

In one construction, the apparatus 10 includes a housing 40 which includes all the components encompassed within the dashed-line 12 shown in FIG. 1. It is noted that the valves 32, 34, 36 and 38 of FIG. 1 are not shown in the sectional view of the housing 40 presented in FIGS. 2-3, but pockets may be formed in such housing 40 to accommodate the valves 32-38 and conduits may be formed in such body 40 to create the fluid paths 42 shown in FIG. 1. It is also noted that brake fluid 43 is shown in FIGS. 2-3 but has been omitted from the fluid paths 42 and the first and second piston bores 28 and 30 of FIG. 1 for clarity.

In one configuration of the first expression of the embodiment of FIGS. 1-3, the motor 14 is a rotary motor. In one variation, the brake fluid accumulator assembly 10 also includes a ball screw subassembly 44 having a ball screw 46 operatively connected to the motor 14 and having a ball nut 48 operatively connected to the ball screw 46 and disposed to push the at-least-one piston 16 and 18 in compression within the corresponding brake-fluid-accumulating piston bore 28 and 30 when the motor 14 moves in the first motor driving direction. When the first piston 16 is a "floating piston", the first piston 16 is not directly or indirectly attached to the ball nut 48. It is noted that a floating piston is moved by fluid pressure from the wheel brake 26 (and not by the motor) to move in expansion within a piston bore when the motor 14 moves the ball nut 48 away from the piston bore. When the second piston 18 is an "attached piston", the second piston 18 is directly or indirectly attached to the ball nut 48.

In one example, the motor 14 is said to move in the first motor driving direction when the motor shaft rotates in a clockwise direction and is said to move in the second motor driving direction when the motor shaft rotates in a counterclockwise direction. In one modification, the brake fluid accumulator assembly 10 also includes an expansion spring brake 50 operatively connected to the motor 14 and the ball screw 46 which locks the ball screw 46 unless the ball screw 46 is driven by the motor 14. Expansion spring brakes are well known to those skilled in the art.

Gearing for a side-by-side arrangement (not shown) of the rotary motor and the ball screw assembly is left to the artisan. In another configuration, not shown, the motor is a linear motor. Other configurations are left to those skilled in the art.

A second expression of the embodiment of FIGS. 1-3 is for apparatus 8 including a brake control assembly 12 having a brake fluid accumulator assembly 10. The brake fluid accumulator assembly 10 includes a brake fluid orifice 11, at least one brake-fluid-accumulating piston bore 28 and 30, a controllable bi-directional motor 14, and at least one piston 16 and 18. The brake fluid orifice 11 is fluidly connectable to a brake apply master cylinder 22 and is fluidly connectable to a wheel brake 26. The at-least-one brake-fluid-accumulating piston bore 28 and 30 is fluidly connected to the brake fluid orifice 11. The motor 14 has a first motor driving direction and an opposite second motor driving direction. The motor 14 is operatively connectable to an electronic control unit 52 (labeled "ECU" in FIG. 1). The at-least-one piston 16 and 18 is each positioned in and slidable within a corresponding brake-fluid-accumulating piston bore 28 and 30 and is each movable by the motor 14, in the first motor driving direction, to move in compression within the corresponding brake-fluid-accumulating piston bore 28 and 30. The brake fluid accumulator assembly 10 is an anti-lock-braking-system (ABS) brake fluid accumulator assembly, the brake apply master cylinder 22 is a motorcycle brake apply master cylinder, and the wheel brake 26 is a motorcycle wheel brake.

In one implementation of the second expression of the embodiment of FIGS. 1-3, the controllable valve 36 is an anti-lock-braking system controllable valve operatively connectable to the electronic control unit 52. It is noted that the enablements, arrangements, constructions, etc. of the first expression of the embodiment of FIGS. 1-3 are equally applicable to the second expression of the embodiment of FIGS. 1-3. It is also noted that non-ABS and/or non-motorcycle applications of the first method are left to the artisan.

Several benefits and advantages are derived from one or more of the expressions of an embodiment of the invention. In one example, the at-least-one piston includes first and second pistons (both "floating pistons") which are not movable by the motor, in the second motor driving direction, to move in expansion within the first piston bore. Experiments support a reduced sensitivity to over-release conditions, and a lower minimum ABS release pressure compared to a conventional brake fluid accumulator assembly. In a second example, the second piston becomes an "attached piston" which is movable by the motor, in the second motor driving direction, to move in expansion within the second piston bore. In one ABS implementation, this should allow an even lower minimum release pressure (approximately 0.5 atmospheres), and support a faster release time during ABS without undesirable phase transition of the brake fluid. This should allow ABS in a motorcycle application, where a very low minimum release pressure during ABS would be required, as can be appreciated by those skilled in the art.

The foregoing description of several expressions of an embodiment of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

The invention claimed is:

1. An apparatus for pressurizing a brake fluid comprising a brake control assembly including a brake fluid accumulator assembly comprising:
   a housing defining a first brake-fluid-accumulating piston bore and a second brake-fluid-accumulating piston bore and defining a brake fluid orifice in fluid communication with each of said first and second brake-fluid accumulating piston bores;
   a first piston slidably disposed in said first brake-fluid-accumulating piston bore and a second piston slidably disposed in said second brake-fluid-accumulating piston bore;
   a controllable bi-directional motor for moving said first and second pistons in a first direction to pressurize the brake fluid toward said orifice; and
   wherein said first piston is floatably disposed in said first brake-fluid-accumulating piston bore and capable of being pushed by said motor in said first direction and for moving in a second direction opposite of said first direction only in response to pressure from the brake fluid from said orifice and independently of said motor.

2. The apparatus of claim 1, wherein said second piston is interconnected with said motor for being moved by said motor in said second direction.

3. The apparatus of claim 1, wherein said brake control assembly also includes a brake fluid inlet which is fluidly connected to said brake fluid orifice of said brake fluid accumulator assembly and which is fluidly connectable to a brake apply master cylinder, a brake fluid outlet which is fluidly connected to said brake fluid orifice of a brake fluid accumulator assembly and which is fluidly connectable to said wheel brake, a check valve disposed between said brake fluid outlet of said brake control assembly and said first and second brake-fluid-accumulating piston bores allowing direct flow from said brake fluid outlet of said brake control assembly to said first and second brake-fluid-accumulating piston bores.

4. The apparatus of claim 3, wherein said brake control assembly also includes a check valve disposed between said brake fluid inlet of said brake control assembly and said first and second brake-fluid-accumulating piston bores allowing direct flow from said first and second brake-fluid-accumulating piston bores to said brake fluid inlet of said brake control assembly.

5. The apparatus of claim 4, wherein said brake control assembly also includes a controllable valve disposed between said brake fluid inlet and said brake fluid outlet of said brake control assembly allowing, when open, direct flow in both directions between said brake fluid inlet and said brake fluid outlet of the brake control assembly and blocking, when closed, direct flow in both directions between said brake fluid inlet and said brake fluid outlet of said brake control assembly.

6. The apparatus of claim 1, wherein said motor is a rotary motor.

7. The apparatus of claim 6, wherein said brake fluid accumulator assembly also includes a ball screw subassembly having a ball screw operatively connected to said motor and having a ball nut operatively connected to said ball screw and disposed to push said first and second pistons in compression within said corresponding brake-fluid-accumulating piston bores when said motor moves in said first direction.

8. The apparatus of claim 7, wherein said brake fluid accumulator assembly also includes an expansion spring brake operatively connected to said motor and said ball screw which locks said ball screw unless said ball screw is driven by said motor.

9. An apparatus comprising a brake control assembly including a brake fluid accumulator assembly comprising:
   a brake fluid orifice which is fluidly connectable to a brake apply master cylinder and which is fluidly connectable to a wheel brake;
   a housing defining a first brake-fluid-accumulating piston bore fluidly connected to said brake fluid orifice and a second brake-fluid-accumulating piston bore fluidly connected to said brake fluid orifice, wherein said brake fluid accumulator assembly is an anti-lock-braking-system brake fluid accumulator assembly, said brake apply master cylinder is a motorcycle brake apply master cylinder, and said wheel brake is a motorcycle wheel brake;
   a controllable bi-directional motor having a first direction and an opposite second motor driving direction, wherein said motor is operatively connectable to an electronic control unit; and
   a first piston disposed in said first brake-fluid-accumulating piston bore and a second piston disposed in and slidable within said second brake-fluid-accumulating piston bore, wherein each piston is movable by said motor in said first direction to compress the brake fluid in said first and second brake-fluid-accumulating piston bore; and
   wherein said first piston is floatably disposed in said first brake-fluid-accumulating piston bore for being pushed by said motor in said first direction and for only moving in a second direction opposite of said first direction in response to pressure from the brake fluid.

10. The apparatus of claim 9, wherein said second piston is movable by said motor in said second direction to relieve the pressure of the brake fluid.

11. The apparatus of claim 9, wherein said brake control assembly also includes a brake fluid inlet which is fluidly connected to said brake fluid orifice of said brake fluid accumulator assembly and which is fluidly connectable to said brake apply master cylinder, a brake fluid outlet which is fluidly connected to said brake fluid orifice of said brake fluid accumulator assembly and which is fluidly connectable to said wheel brake, a check valve disposed between said brake fluid outlet of said brake control assembly and said first and second brake-fluid-accumulating piston bores allowing direct flow from said brake fluid outlet of said brake control assembly to said first and second-brake-fluid-accumulating piston bores.

12. The apparatus of claim 11, wherein said brake control assembly also includes a check valve disposed between said brake fluid inlet of the brake control assembly and said first and second brake-fluid-accumulating piston bores allowing direct flow from said first and second brake-fluid-accumulating piston bores to said brake fluid inlet of said brake control assembly.

13. The apparatus of claim 12, wherein said brake control assembly also includes a controllable valve disposed between said brake fluid inlet and said brake fluid outlet of said brake control assembly allowing, when open, direct flow in both directions between said brake fluid inlet and said brake fluid outlet of said brake control assembly and blocking, when closed, direct flow in both directions between said brake fluid inlet and said brake fluid outlet of said brake control assembly, and wherein said controllable valve is an anti-lock-braking system controllable valve operatively connectable to said electronic control unit.

14. The apparatus of claim 9, wherein said motor is a rotary motor.

15. The apparatus of claim 14, wherein said brake fluid accumulator assembly also includes a ball screw subassembly having a ball screw operatively connected to said motor and having a ball nut operatively connected to said ball screw and disposed to push said first and second pistons in compression within said corresponding brake-fluid-accumulating piston bores when said motor moves in said first direction.

16. The apparatus of claim 15, wherein said brake fluid accumulator assembly also includes an expansion spring brake operatively connected to said motor and said ball screw which locks said ball screw unless said ball screw is driven by said motor.

\* \* \* \* \*